(12) United States Patent
Tanaka

(10) Patent No.: US 6,215,949 B1
(45) Date of Patent: *Apr. 10, 2001

(54) PICTURE PROCESSOR AND PICTURE EDITING SYSTEM

(75) Inventor: Toshiyuki Tanaka, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/592,380
(22) PCT Filed: May 29, 1995
(86) PCT No.: PCT/JP95/01027
§ 371 Date: Oct. 15, 1996
§ 102(e) Date: Oct. 15, 1996
(87) PCT Pub. No.: WO95/33335
PCT Pub. Date: Dec. 7, 1995

(30) Foreign Application Priority Data

May 30, 1994 (JP) .................................................. 6-139452

(51) Int. Cl.[7] ............................. H04N 5/93; G11B 27/00
(52) U.S. Cl. ............................................. 386/52; 386/65
(58) Field of Search ................................. 386/4, 52, 55, 386/60, 61, 62, 64, 65; 360/13

(56) References Cited

U.S. PATENT DOCUMENTS

| 5,508,871 | * | 4/1996 | Ng ........................................ 360/132 |
| 5,706,386 | * | 1/1998 | Miyazawa .............................. 386/52 |
| 5,825,967 | * | 10/1998 | Stewart et al. ......................... 386/52 |

FOREIGN PATENT DOCUMENTS

| 0 176 324 A1 | * | 4/1986 | (EP) . |
| 2-94883 | | 4/1990 | (JP) . |
| 4-3384 | | 1/1992 | (JP) . |
| 4-77188 | | 3/1992 | (JP) . |

* cited by examiner

Primary Examiner—Thai Tran
Assistant Examiner—Christopher Onuaku
(74) Attorney, Agent, or Firm—Frommer Lawrence & Haug, LLP.; William S. Frommer; Bruno Polito

(57) ABSTRACT

A time-divided multi-task image processing apparatus conducts each task in a time slice. This image processing apparatus correlates a first identification code to the picture information sequentially input and stores it in memory means for a specified period. Then, when the second identification code having any value is given from an external device which generates the second identification code synchronized with the first identification code, the image processing apparatus searches the first identification code which has the nearest value to that of the second identification code and which satisfies a specified relation between the value of the second identification code by second control means, and then reads out the picture information which is combined with the first identification code from the memory means.

8 Claims, 6 Drawing Sheets

PICTURE PROCESSOR AND PICTURE EDITING SYSTEM

TECHNICAL FIELD

This invention relates to an image processing apparatus and a video editing system. More particularly, this invention relates to an image processing apparatus and a system using that in which an editing point of a real-time reproduced image is set by means of a processing apparatus of time-division task type.

BACKGROUND ART

A time code ("hour, minute, second, and a frame number" or "hour, minute, second, a frame number, and a field number") is given to respective images which are reproduced by a video tape recorder as time information.

Generally, a video processing apparatus used for video editing captures and stores a video image at the point directed to treat by the user in a memory as an editing point image, and displays the stored editing point image and the corresponding time code as one pair.

At this time, the video processing apparatus usually either displays a pair of editing point image of normal size or plural pairs of editing point images of reduced size.

On the other hand, when a processing apparatus of time-division task type such as a workstation is used in this kind of video processing apparatus, there is the following problem.

In the workstation, the processing time is divided into plural time slices, and the respective task is conducted in each time slice.

Therefore, when a capture instruction is obtained from the user, the capture processing of images cannot be executed at once, as a result, it cannot be avoided that a time lag is generated between the time code of the image which is actually captured and the time code of the image which is to be captured.

To avoid this, it has been required to place some kind of image capturing hardware such as a time code reader.

However, there is a problem that if an image capturing hardware is placed in this manner, the image processing apparatus becomes larger and its structure becomes complicated.

DISCLOSURE OF THE INVENTION

This invention relates to an image processing apparatus and a video editing system for solving the above-described problem.

In this invention, a time-divided multi-task image processing apparatus comprises: identification code generating means for generating a first identification code; first control means for corresponding the picture information input sequentially to the first identification code; memory means for storing the picture information and the first identification code which has been correlated to each other by the first control means as one pair for a specified period; and second control means, such that when the second identification code of any value is given from an external device for generating the second identification code which synchronizes with the first identification code, for searching the first identification code which has the nearest value to the value of the second identification code in which a fixed relation between that is satisfied, and reading out the picture information which is combined with the first identification code from the memory means.

In the image processing apparatus according to this invention, the picture information to be processed is memorized corresponding to the first identification code, and is searched using the second identification code which has a relation of synchronization between the first identification code when searching. As a result, even in a time-divided multi-task image processing apparatus in which the time for image processing is not constant, necessary picture information can be detected certainly.

BEST MODE FOR CARRYING OUT THE INVENTION

An image processing apparatus and a video editing system according to this invention will be described in detail hereinafter with reference to the drawings. Note that, in the embodiment that will be described hereinafter, it is assumed that a motion picture is reproduced from a video tape recorder.

(1) Video Editing System (1-1) General Construction

Figure 1:
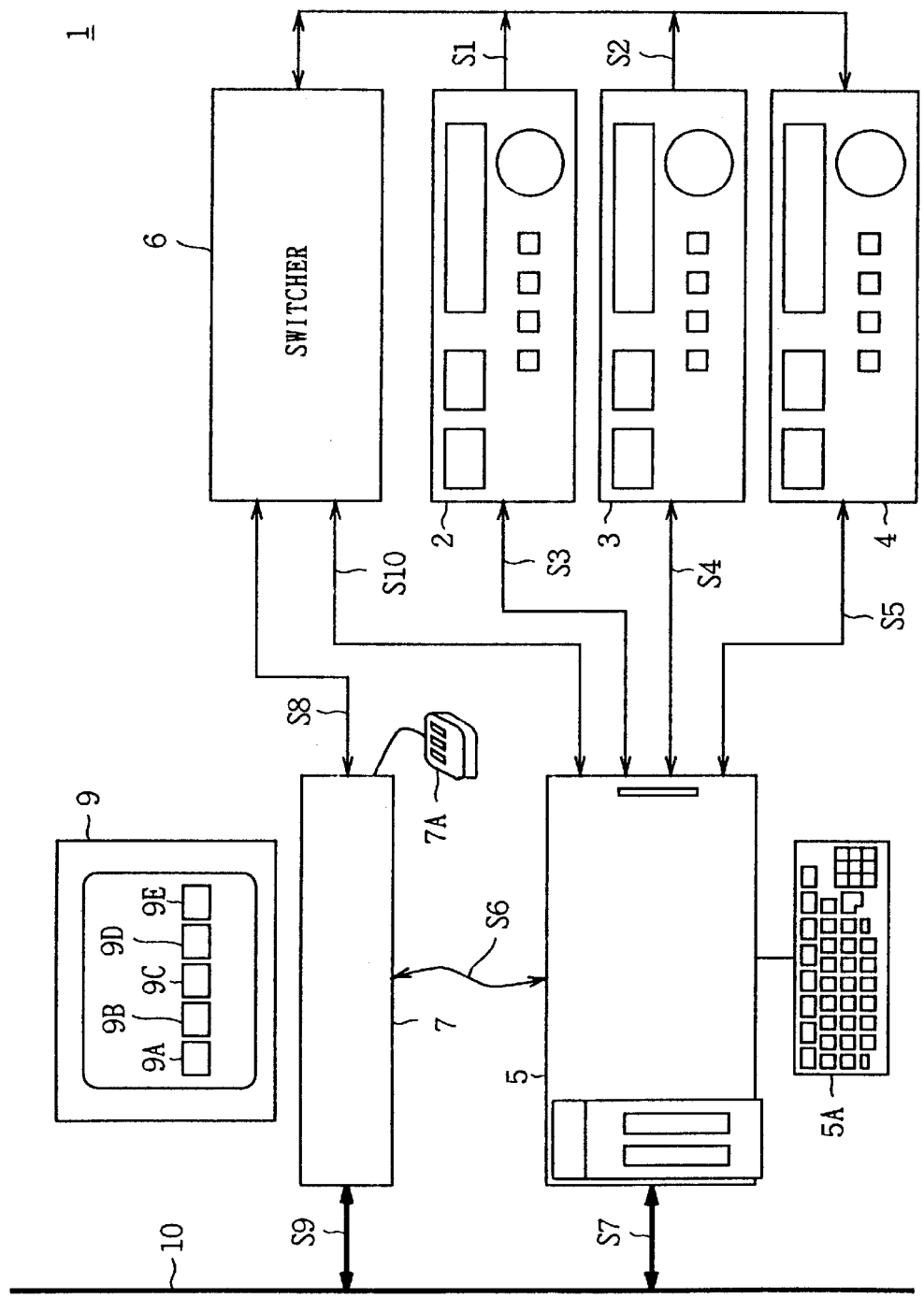
FIG. 1 is a diagram showing the schematic structure of the video editing system according to the embodiment of this invention.

FIG. 1 shows the general construction of the video editing system according to the embodiment of this invention. The more detailed internal structure of each unit will be described after the following clause again.

A video editing system 1 shown in FIG. 1 is composed of plural video tape recorders 2 to 4, a video tape recorder controller 5 which controls these recorders, a switcher 6, a workstation 7, and a display device 9.

Among them, the two video tape recorders 2 and 3 are used to reproduce motion picture, and the video tape recorder 4 is used to record motion picture which has been edited based on an editing list (reproducing apparatus information and editing points (a start point, an end point)).

Here, a video signal and an audio signal reproduced in the video tape recorders 2 and 3 are output as reproduced signals S1 and S2.

The video tape recorder controller 5 gives control signals S3 to S5 to the video tape recorders 2 to 4 to control their recording/reproducing operation and outputs time information (the Greenwich standard time and a time code) at the time point when the capture instruction of an editing point image is input by a mark key which has been provided on a keyboard 5A, to the workstation 7 as a control command S6.

At this time, the control command S6 is output to the workstation 7 via a serial transfer interface such as the RS-232C. In this manner, by assuming the form such that the control command S6 is sent via a serial line is applied, information can be transmitted without waiting even if there is a lot of traffic on the network 10 which is a bus interface. In this connection, in the case of this embodiment, the Ethernet is used as the network 10.

Also, the video tape recorder controller 5 synchronizes the time of a built-in clock (a clock 5B described later) with the time of a clock built in the workstation 7 (the clock 7B described later) whenever a time synchronizing signal S7 is input via the network 10, so as to prevent the generation of a time lag between two built-in clocks. In this manner, the time of these built-in watches are coincide with each other so that a time lag between the editing point image which has been instructed to be captured to the video tape recorder controller 5 and the editing point image which is captured by the workstation 7 does not occur.

The switcher 6 effects simple special effects to the reproduced signals S1 and S2 and outputs either signal to the workstation 7 as an editing reproduced signal S8. In this connection, the editing reproduced signal S8 is also output to the display device 9. The display device 9 is used to display reproduced motion picture so as to select the editing point image by the user along with the time code added to each picture.

The work station 7 is a video editing apparatus being a time-division task processing apparatus in which, although a time lag between the time when the capturing of the editing image has been instructed and the time when the command which instructs the capturing of the editing point image is actually processed is generated, the image and the time which correspond to the time point when the capturing is instructed can be captured correctly.

The work station 7 has a loop buffer memory for always storing plural frame pictures which are past from the newest frame picture. Further, the workstation 7 has a memory for editing point candidate image which stores pictures of plural frames before and after the time point when the capturing of the image was instructed, so that the user can reset it to a more suitable editing point than the editing point which has been instructed roughly by the user.

In this connection, the editing point candidate image stored in the memory for editing point candidate image is displayed on the screen of the display device 9 for the user's selection.

Further, in the workstation 7, one of the plural editing point candidate images 9A to 9E which are displayed on the screen of the display device 9 can be selected by means of a mouse 7A, and an editing list is made based on the information of the editing point that has been set finally.

Then, the workstation 7 outputs the editing list as a control data S9 via the network 10 to give it to the video tape recorder controller 5.

In the following clauses, the more detailed circuit structures of the video tape recorder controller 5 and the workstation 7 out of various devices constructing the video editing system 1 will be described continuously.

(1-2) Structure of Video Tape Recorder Controller

Figure 2:
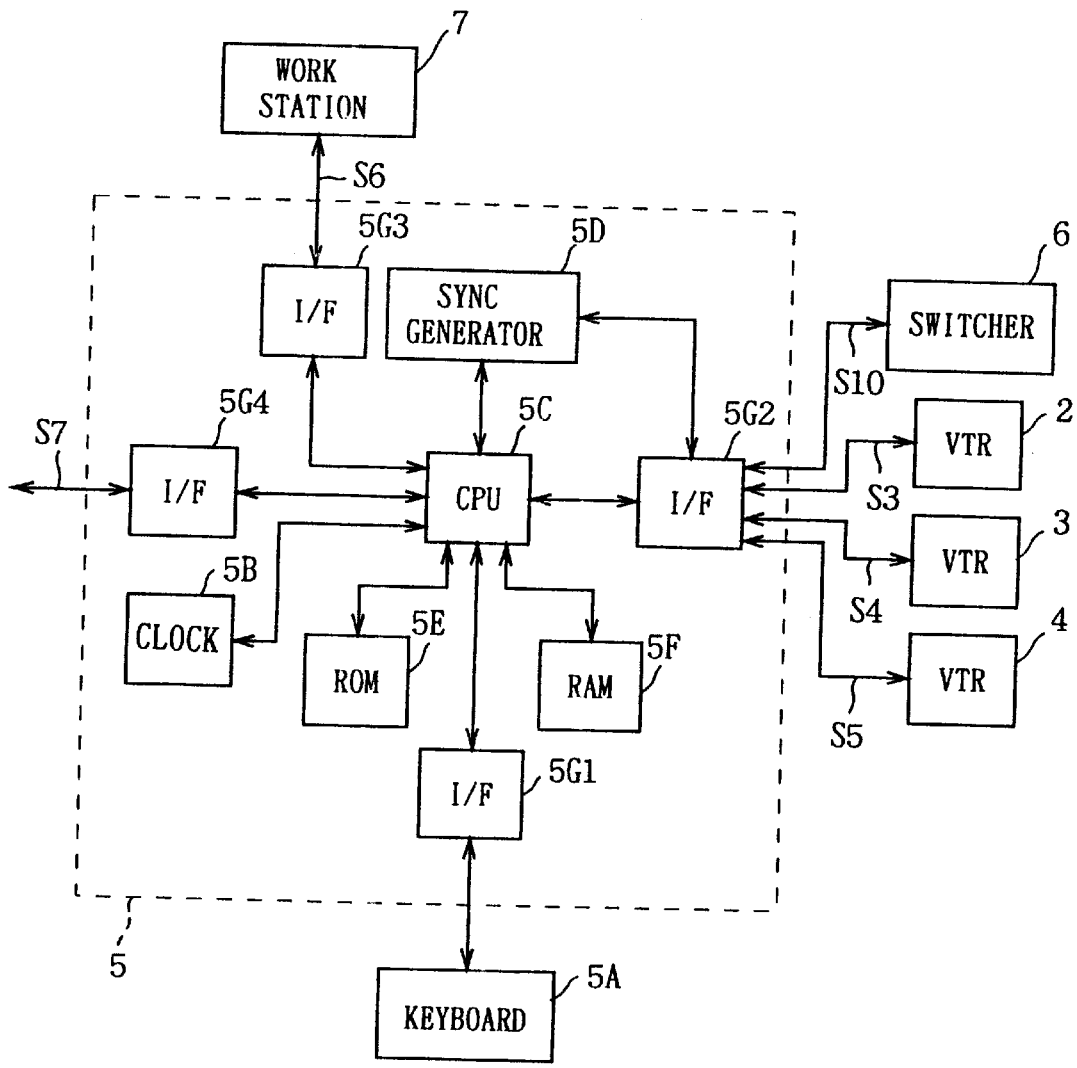
FIG. 2 is a diagram showing the structure of the video tape recorder controller according to the embodiment of this invention.

FIG. 2 shows the circuit structure of the video tape recorder controller 5.

The video tape recorder controller 5 is composed of a CPU 5C, a sync generator 5D, a ROM 5E, a RAM 5F, and an interface 5G other than the above-mentioned clock 5B.

The clock 5B gives the Greenwich standard time to the internal circuits, and synchronizing processing is performed periodically so as to match the time with the time of the clock built in the workstation 7.

Figure 3:
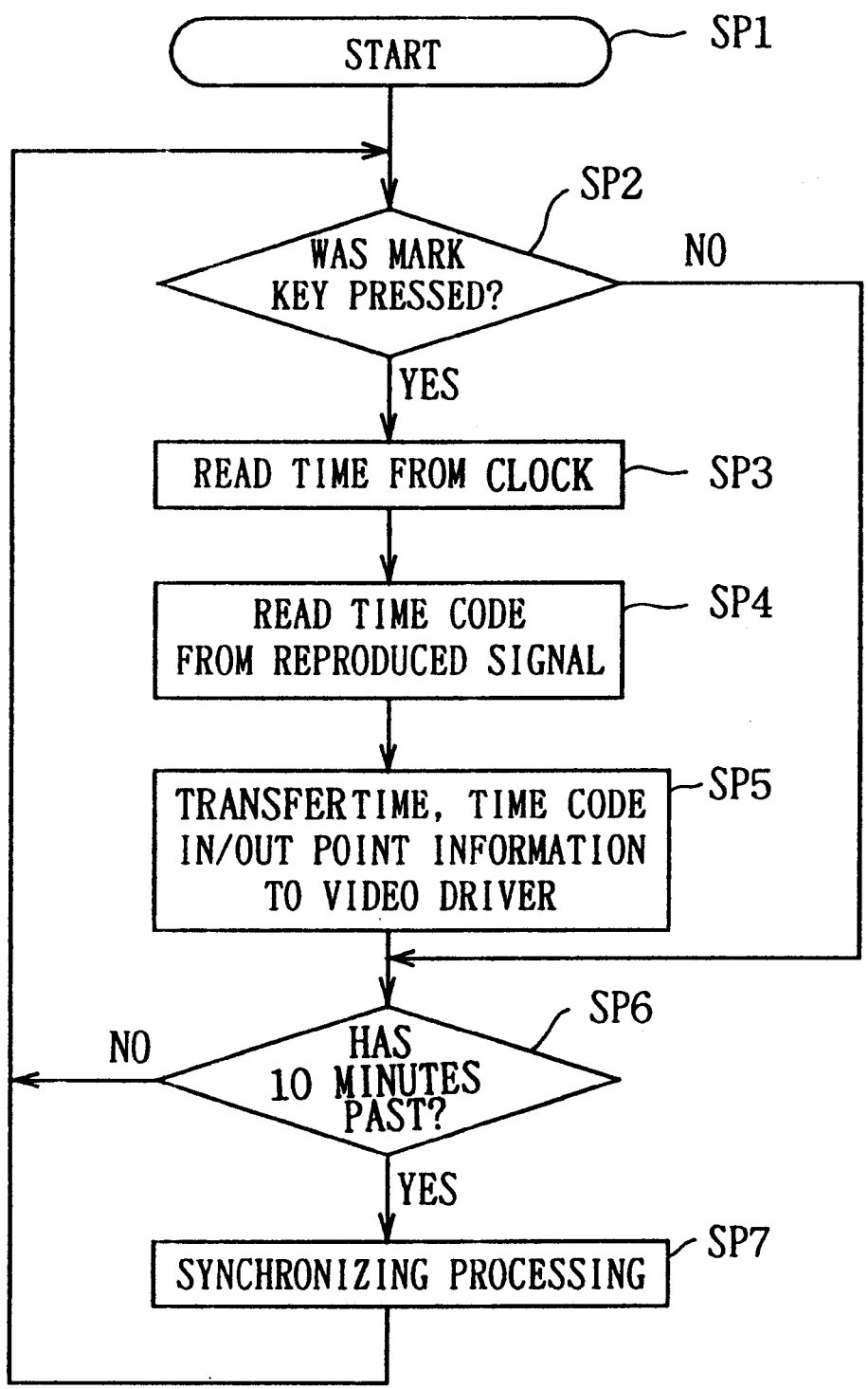
FIG. 3 is a flowchart explaining the processing operation of the video tape recorder controller of FIG. 2.

The CPU 5C controls the operation of the internal circuits and the operation of the peripheral equipments (the video tape recorders 2 to 4 and the switcher 6) via the interface 5G2. Here, the CPU 5C executes various processing in accordance with the processing procedure which has been defined by the software by using the ROM 5E and the RAM 5F. FIG. 3 shows this processing procedure.

The CPU 5C starts the processing from step SP1, and at step SP2, it judges whether the mark key which instructs the capture of an editing point image has been pressed or not.

At this time, if an affirmative result is obtained, the CPU 5C judges that the user found an image to use as an editing point (edit start point or edit end point) among the motion pictures displayed on the display device 8, and it proceeds to step SP3 to read-in the current time from the clock 5B.

Then, at the following step SP4, the CPU 5C outputs the control signal S10 to the switcher 6 via the interface 5G2 to read-in the value of the time code added to the editing reproduced signal S8 which is to be output now from the switcher 6. At this time, a time lag of 1 to several clocks is generated between the timing reading in the current time and the timing reading in the time code, however, since the time code is a value having the unit of $1/100$ [sec] where as the Greenwich standard time is a value having the unit of $1/1000$ [sec], the value read-in at the step SP4 becomes the value of the time point when the mark key was pressed.

After the time when the mark key was pressed and the time code are read-in at the steps SP3 and SP4 as the above, at step SP5, the CPU 5C outputs information showing the distinction between an editing start point (IN point) and an editing end point (OUT point) of these time information as a control command S6. In this connection, the control command S6 is transferred to a video driver of the workstation 7 described later.

After finishing the processing of these steps SP3 to SP5, or when a negative result is obtained at the step SP2, the processing of the CPU 5C proceeds to step SP6.

Here, the CPU 5C judges whether 10 minutes has past from the last synchronizing processing or not. Here, if an affirmative result is obtained, the CPU 5C proceeds to step SP7 to perform the synchronizing processing such that it causes the time of the clock 5B to match with the time of the clock built in the workstation 7. Further, at this time, the CPU 5C causes the built-in watches of the video tape recorders 2 to 4 and the switcher 6 to synchronize with the clock 5B by using the sync generator 5D. Then, after the series of these processing are finished, the CPU 5C returns to the step SP2 to conduct the above-mentioned processing operations repeatedly.

On the other hand, if a negative result is obtained, the CPU 5C returns from the step SP6 to the step SP2 to repeat the series of operations.

In this connection, in the case where an editing list is taken-in from the workstation 7 via the network 10, the CPU 5C controls the video tape recorders 2 to 4 based on the contents of this editing list.

(1-3) Structure of Workstation

Figure 4:
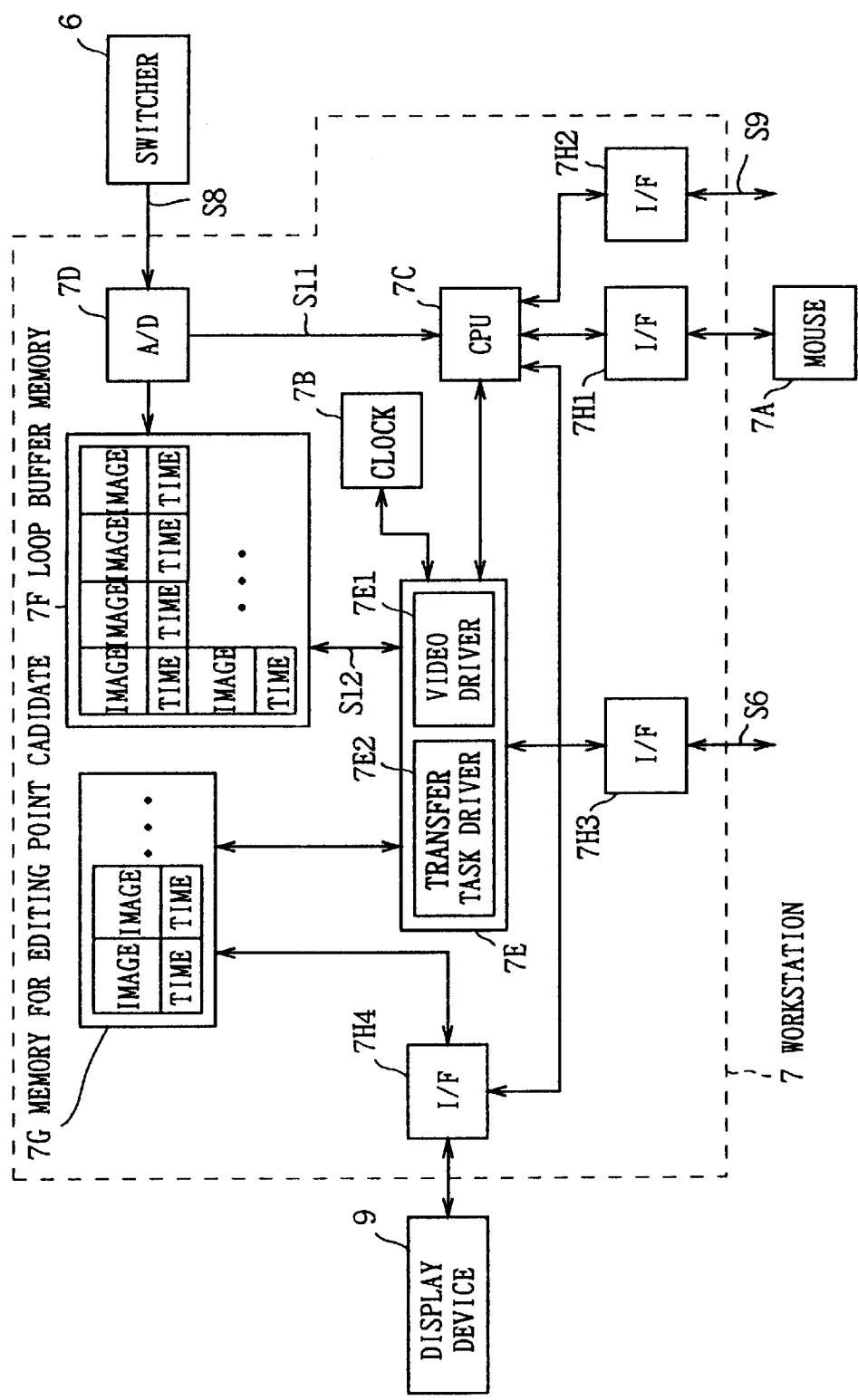
FIG. 4 is a diagram showing the structure of the workstation according to the embodiment of this invention.

FIG. 4 shows the circuit structure of the workstation 7.

The workstation 7 is composed of a CPU 7C, an A/D convertor 7D, a driver memory 7E, a loop buffer memory 7F, a memory for editing point candidate image 7G, and an interface 7H in addition to the clock 7B described above.

Here the clock 7B gives the Greenwich standard time to the internal circuits and the circumference equipments, and it operates as a basis in this video editing system.

The CPU 7C is the main circuit of the workstation 7 which executes multi-task by time-division, and controls the capturing of picture data to various memories and the creation of the editing list.

For example, in the case where one of the editing point candidate images 9A to 9E is selected by a pointing device such as the mouse 7A, the CPU 7C stores information showing that this clipped image is the editing start point or the editing end time and its time code in the editing list as a pair.

Further, when the CPU 7C detects that a picture signal for one frame which has been input to the A/D convertor 7D from the switcher 6 was converted into digital data by a flag signal S11 input from the A/D convertor 7D, the CPU 7C starts the video driver 7E1 of the driver memory 7E and sequentially transfers the image which has been converted into digital data to the loop buffer memory 7F as a clipped image.

Figure 5:
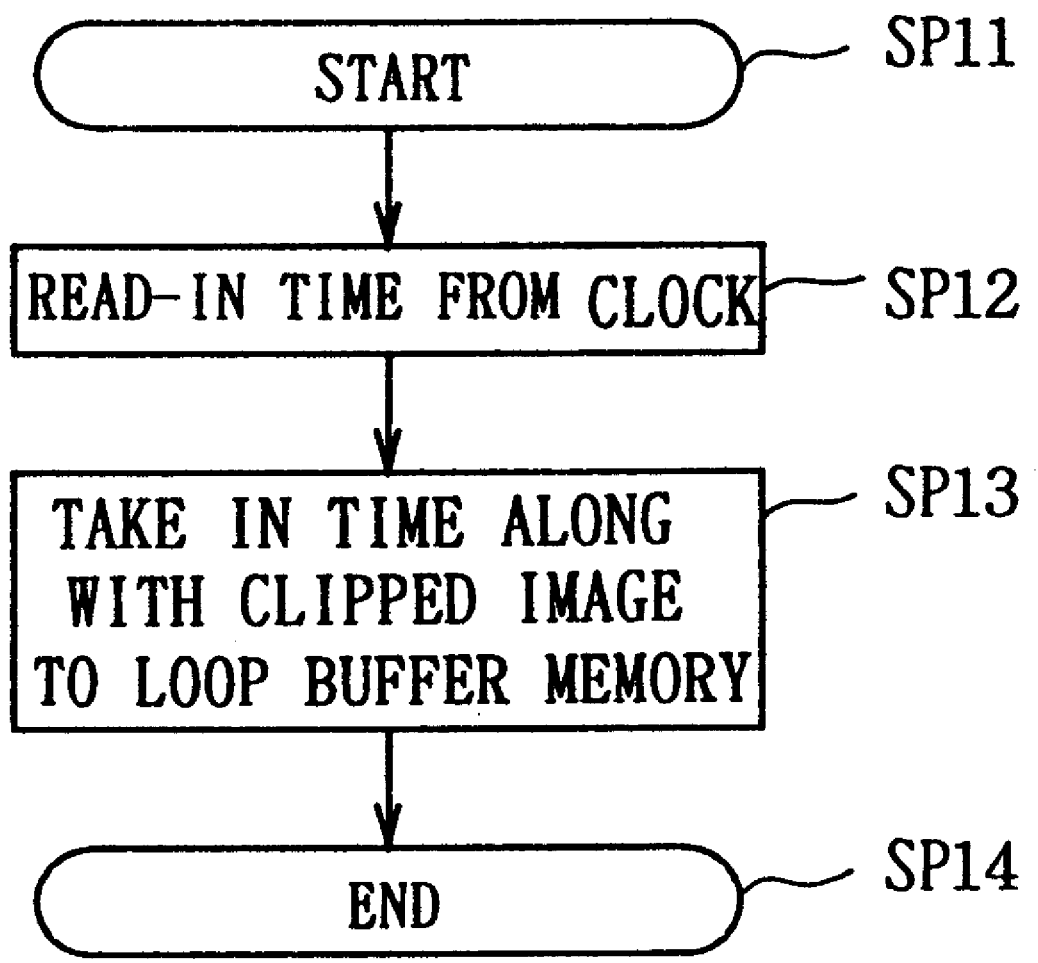
FIG. 5 is a flowchart explaining the processing operation of the workstation of FIG. 4.

FIG. 5 shows the processing procedure by the video driver 7E1. First, the video driver 7E1 starts the processing from step SP11, and at step SP12, it reads-in the time of the clock 7B in order to read-in the time to capture the clipped image.

After proceeding to the following step SP13, the video driver 7E1 outputs a read-in control signal S12 to the loop buffer memory 7F to instruct the read in of the clipped image, so that the clipped image which has been captured at the oldest time point is updated to the newest clipped image. At this time, the video driver 7E1 memorizes the clipped image and the Greenwich standard time which is read-in at the step SP12 as a pair, and then terminates the processing.

The loop buffer memory 7F has a structure in which plural frame memories are connected in series. In this embodiment, clipped images for 50 to 60 frames can be stored. In this manner, the clipped images for about 2 [sec] are stored in the buffer memory so that a time lag between the time point of capturing the editing image which is given by the control command S6 and the time that the capturing processing is actually executed can be assimilated.

The memory for editing point candidate image 7G is an image memory which is used to store clipped images necessary for setting the editing point out of the clipped images which has been temporarily stored in the loop buffer memory 7F, in which the clipped images of several tens of frames which precede and follow the clipped image that the user designated as an editing point.

Figure 6:
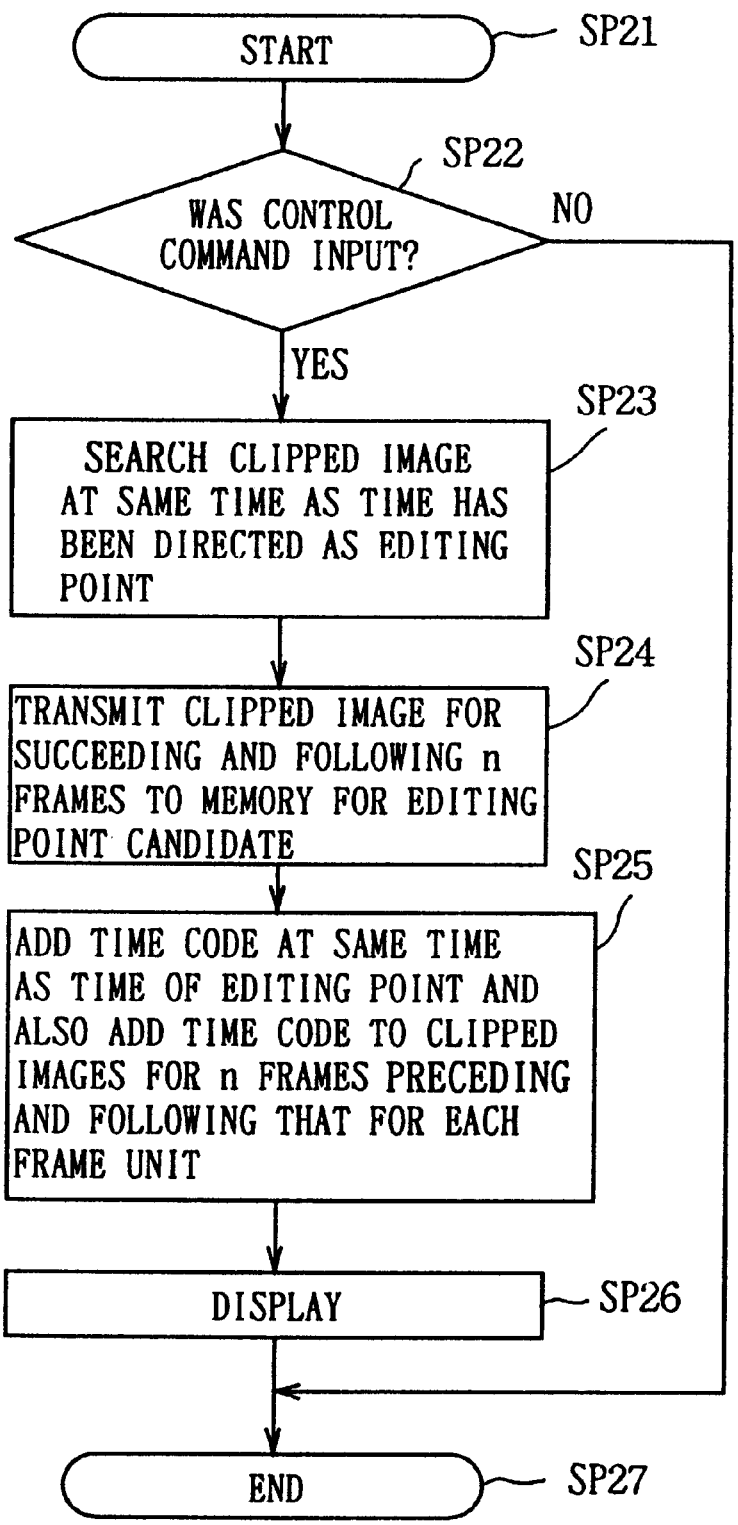
FIG. 6 is a flowchart explaining the processing operation of the workstation of FIG. 4.

Transfer of the clipped images to the memory for editing point candidate image 7G is performed by a transfer task driver 7E2. FIG. 6 shows the processing procedure executed in the transfer task driver 7E2.

The transfer task driver 7E2 starts the processing from step SP21, and then proceeds to step SP22 to judge whether the control command S6 which instructs the capturing of the editing point image is input or not.

At this time, if an affirmative result is obtained, the transfer task driver 7E2 proceeds to step SP23 to start the operation for searching the clipped image in which A/D conversion has finished at the same time as the time that has been instructed to capture as the editing point (the editing start point or the editing end point), from the loop buffer memory 7F.

When the corresponding clipped image is found out, the transfer task driver 7E2 transfer the clipped images for several tens of frames (for example, 15 frames) which precede and follow the clipped image found out, to the memory for editing point candidate image 7G in the processing of step SP24.

Then, the transfer task driver 7E2 obtains the value of time codes respectively based on the Greenwich time added to each clipped image by calculation and adds it to respective clipped images. At this time, the transfer task driver 7E2 calculates the time code for each clipped image based on the time code sent as the control command S6. This relies upon that the time code not always become continuous values due to the difference in the format of video signals (NTSC/PAL/SECAM/PALM and the like) or existence of dropped frames.

In this manner, if the time code of each clipped image is obtained, the transfer task driver 7E2 displays the editing point candidate images 9A to 9E each which is composed of the clipped image converted to a reduced size and the time code, on the screen of the display device 9, and then terminates the series of processing.

In this connection, while a capture instruction of the editing point image is not given from the user, i.e., while a negative result is obtained at the step SP22, these processing are not executed.

The series of processing in the transfer task driver 7E2 is performed repeatedly every time when the capturing of the editing point image is instructed by the user, and it is memorized to a different area of the memory for editing point candidate image 7G. Then, these editing point candidate images 9A to 9E are displayed on the screen of the display device 9 similar to the editing point candidate images 9A to 9E obtained before then. In this connection, in the case where the all of these plural editing point candidate images cannot be displayed on the screen of the display device 9 at once, it can be displayed by scrolling the screen. The above is the processing operation by the transfer task driver 7E2.

(2) Example of Editing Work

On the above arrangement, an example of editing work utilizing the video editing system will be described. However, it is assumed that the Greenwich standard time is set at the unit of $1/1000$ [sec].

First, in case of setting the clipped image giving the editing start point will be described.

The user waits for appearance of the image which is suitable to his editing aim while monitoring the motion pictures displayed on the screen of the display device 8 and presses the mark key provided on the keyboard 5A at the scene of the image suitable to his aim.

Assuming that the Greenwich standard time is "1 o'clock 10 minute 10 second 480/1000" and the time code is "the 21st frame of 0 o'clock 40 minute 40 second" at the instant, the CPU 5C of the video tape recorder controller 5 outputs these time information to the workstation 7 as the control command S6.

On the other hand, assuming that in the workstation 7, the A/D converting processing of this image terminates at for example, the Greenwich standard time "1 o'clock 10 minute 10 second 485/1000" and it is taken in the loop buffer memory 7F without delay, the transfer task driver 7E2 detects a corresponding clipped image based on the Greenwich standard time "1 o'clock 10 minute 10 second 480/1000" which is given by the control command S6 from the loop buffer memory 7F, and transfers clipped images for several tens frames in which the detected one is the center frame, to the memory for editing point candidate image 7G.

At this time, the transfer task driver 7E2 generates a time code to be added to the several tens of frames of clipped images which precede and follow based on the time code given by the control command S6, namely, "21st frame 0 o'clock 40 minute 40 second".

After these calculation are finished, plural editing point candidate images 9A to 9E in which the clipped image at the time instructed to capture by the user is the center are displayed on the screen of the display device 9. The user determines the clipped image of the editing start point by selecting one of the plural editing point candidate images 9A to 9E by means of the mouse 7A or by inputting the time code added to the clipped image to be selected by means of the keyboard or the like.

In this connection, if any clipped image is not displayed even if scrolling the picture in the horizontal direction, the user reads out the editing point candidate images 9A to 9E which give the other editing start point by scrolling the picture in the vertical direction and continues the setting of the editing start point.

Similarly, the clipped image giving the editing end point can also be set. The user can set editing points by this series of tasks.

By the way, basically the only necessary device in the workstation 7 having such structure is the picture memory, and hardware such as a time code reader is unnecessary because the time code is given by the video tape recorder controller 5.

On the above structure, the time of the clock 5B which has been built in the video tape recorder controller 5 is matched with the time of the clock 7B which has been built in the workstation 7 previously, and when the capturing of the editing point image is instructed by the user, the time at the instant when the capturing was instructed from the video tape recorder controller 5 and the time code are given to the workstation 7, so that it is possible that the image which is found out by the workstation 7 based on the time of the clock 7B always matches with the image which is aimed by the user.

Further, the workstation 7 stores the clipped image which is sequentially captured adding the time, and keeps them for a predetermined time. When the capturing of the editing point image as a candidate is instructed by the user, a clipped image which has the same time is searched from the loop buffer memory 7F based on the time information given as the control command S6, and several tens of frames preceding and following this clipped image are displayed on the screen added the time code. Thereby, the clipped image aimed by the user can be always extracted and displayed not depending on a time lag between the processing time in the workstation 7 and the time when capturing is instructed by the user.

Further, the several tens of frames of clipped images preceding and following and including the center frame are displayed on the same screen as the editing point candidate images, so that the final editing start point and a final editing end point can be set while comparing those. Thereby, the visibility improves comparing with the case where the editing work is proceeded depending only on characters of the time code, and the editing work can be conducted more efficiently.

(3) Other Embodiments

Note that, in the above-mentioned embodiment, it has been described the case where the time of the clock 5B which is built in the video tape recorder controller 5 utilized as a reproducing apparatus control device is synchronized with the Greenwich standard time of the clock 7B which is built in the workstation 7. However, this invention is not limited to this but the time of the clock 5B built in the video tape recorder controller 5 and the time of the clock 7B built in the workstation 7 may be synchronized to other standard time.

Further, in the above-mentioned embodiments, it has been described the case where the workstation 7 is utilized as an image processing apparatus. However, this invention is not limited to this but may be applied to the case where other generic computer which operates based on an OS (Operating System) operating by switching the task for each time slice.

Further, in the above-mentioned embodiments, it has been described the case where the video tape recorders 2 to 4 are utilized as reproducing apparatuses for real-time-processing a video signal. However, this invention is not limited to this but may be applied to a magnetic reproducing apparatus such as a magnetic disc apparatus, an optical disc apparatus such as a magneto-optical disc apparatus, or a reproducing apparatus using a semiconductor memory.

Further, in the above-mentioned embodiments, it has been described the case where the control command S6 is transferred via a serial transfer interface. However, this invention is not limited to this but may be applied to the case of transferring via a network.

Furthermore, in the above-mentioned embodiments, it has been described the case where this invention is utilized in an editing apparatus of motion pictures. However, this invention is not limited to this but may be applied to the case where motion pictures between specified time codes are displayed on the screen among picture signals reproduced by one or plural reproducing apparatuses, and the case where the motion picture is displayed on the screen with a projector.

INDUSTRIAL APPLICABILITY

This invention can be applied to a time-division task processing apparatus which treats real-time pictorial images, for example, an image processing apparatus such as a workstation or a personal computer.

In addition, this invention can also be applied to a video editing system for editing an image by means of these processing apparatuses.

What is claimed is:

1. A time-division multi-task image processing apparatus, comprising:

identification code generating means for generating a first identification code automatically in response to a first identification code generation command such that said first identification code does not have to be input by a human operator, said first identification code being indicative of the time of occurrence of said first identification code generation command and being a Greenwich Standard Time expressed as a time specified to a predetermined unit accuracy;

first control means for correlating said first identification code to first picture information which is input sequentially;

memory means for storing the first picture information and the first identification code which correspond to each other by said first control means, as a pair for a specified period; and second control means for searching the first identification code which has a specified relation to the value of a second identification code, when said second identification code is provided by an external device for generating the second identification code automatically in response to a second identification code generation command such that said second identification code does not have to be input by a human operator, said second identification code being indicative of the time of occurrence of said second identification code generation command and being a moving picture signal time code expressed as a frame number and a time which is specified to a unit accuracy larger than said predetermined unit accuracy, wherein said second identification code synchronizes with said first identification code and said second identification code is sequentially correlated with second picture information, and for reading out a combination of said first picture information and said second picture information.

2. The time-divided multi-task image processing apparatus according to the claim 1, wherein when said external device sends recording time information which corresponds to said picture information along with said second identification code, said second control means correlates said recording time information to the detected picture information.

3. The time-divided multi-task image processing apparatus according to claim 2, wherein said second control means generates plural recording time information preceding and following to the recording time information based on recording time information which correspond to the detected picture information, and correlates plural recording time information to each picture information which has been inputted before and after said detected picture information respectively.

4. The time-divided multi-task image processing apparatus according to claim 3, comprising display means for displaying the picture information which has been detected by said second control means and picture information which have been input before and after the picture information, on a display screen.

5. The time-divided multi-task image processing apparatus according to claim 1, wherein said first and second identification codes are time information.

6. The time-divided multi-task image processing apparatus according to claim 1, wherein said memory means is a loop buffer memory in which the newest picture information is stored to the head memory area, and is sequentially transferred to the latter memory area at a specified time.

7. The time-divided multi-task image processing apparatus according to claim 1, wherein said second identification code is directly input via generic serial transmitting interface.

8. A video editing system comprising:

a reproducing apparatus for sequentially reproducing and outputting picture information;

a reproducing apparatus control device for controlling the reproducing operation of said reproducing apparatus; and a time-divided multi-task image processing apparatus having identification code generating means for generating a first identification code automatically in response to a first identification code generation command such that said first identification code does not have to be input by a human operator, said first identification code being indicative of the time of occurrence of said first identification code generation command and being a Greenwich Standard Time expressed as a time specified to a predetermined unit accuracy, first control means for sequentially correlating said first identification code to first picture information generated by said reproducing apparatus, memory means for memorizing the first picture information and the first identification code which correspond to each other by said first control means as a pair for a specified period, and second control means for searching the first identification code which has a specified relation to the value of a second identification code, when said second identification code is provided by said reproducing apparatus control device for generating the second identification code automatically in response to a second identification code generation command such that said second identification code does not have to be input by a human operator, said second identification code being indicative of the time of occurrence of said second identification code generation command and being a moving picture signal time code expressed as a frame number and a time which is specified to a unit accuracy larger than said predetermined unit accuracy, wherein said second identification code synchronizes with said first identification code and said second identification code is correlated with second picture information sequentially, and for reading out from a video feed a combination of said first picture information and said second picture information.

* * * * *